Nov. 16, 1965   R. E. BENDL   3,218,100
EXTERNAL LOAD HELICOPTER CARGO HOOK WITH TOUCH DOWN RELEASE
Filed Dec. 23, 1963   5 Sheets-Sheet 1

INVENTOR.
ROBERT E. BENDL
BY: Harry M. Saragovitz,
Edward J. Kelly,
Herbert Berl &
James W. Colvin Nov. 16, 1965                R. E. BENDL                3,218,100
            EXTERNAL LOAD HELICOPTER CARGO HOOK WITH TOUCH DOWN RELEASE
Filed Dec. 23, 1963                                 5 Sheets-Sheet 2

INVENTOR.
ROBERT E. BENDL
BY: Harry M. Saragovitz,
    Edward J. Kelly,
    Herbert Berl &
    James W. Colvin Nov. 16, 1965  R. E. BENDL  3,218,100
EXTERNAL LOAD HELICOPTER CARGO HOOK WITH TOUCH DOWN RELEASE
Filed Dec. 23, 1963  5 Sheets-Sheet 3

INVENTOR.
ROBERT E. BENDL
BY: Harry M. Saragovitz,
Edward J. Kelly,
Herbert Berl &
James W. Colvin

United States Patent Office 3,218,100
Patented Nov. 16, 1965

3,218,100
EXTERNAL LOAD HELICOPTER CARGO HOOK
WITH TOUCH DOWN RELEASE
Robert E. Bendl, Grafton Court, R.F.D. 2,
Denbigh, Va.
Filed Dec. 23, 1963, Ser. No. 332,983
3 Claims. (Cl. 294—83)
(Granted under Title 35, U.S. Code (1952), sec. 266)

The invention described herein may be manufactured and used by or for the Government for governmental purposes without the payment to me of any royalty thereon.

This invention relates to hook assemblies for supporting air transportable cargo packages externally of aircraft, such as helicopters, and more particularly to a hook assembly which will automatically release a cargo package when the package is lowered into contact with the ground and the hook assembly is relieved of the weight of the cargo load.

It is among the objects of the invention to provide an improved open throat cargo hook assembly which can be quickly and easily engaged by an operator with a cargo harness at the load pick up location and which will automatically release the harness, without the assistance of ground personnel, when the cargo package is touched down on the ground.

It is a further object of the invention to provide an improved cargo hook assembly which, while it will release a suspended cargo package when the package is actually touched down on the ground, will not accidentally release the package in the air when the supporting aircraft is subjected to wind gusts, thermal currents or other turbulent operating conditions.

It is a still further object to provide an improved cargo hook assembly which is strong and durable in construction, economical to manufacture and positive and reliable in operation.

Other objects and advantages will become apparent from a consideration of the following description and the appended claims in conjunction with the accompanying drawings wherein:

Figure 1:
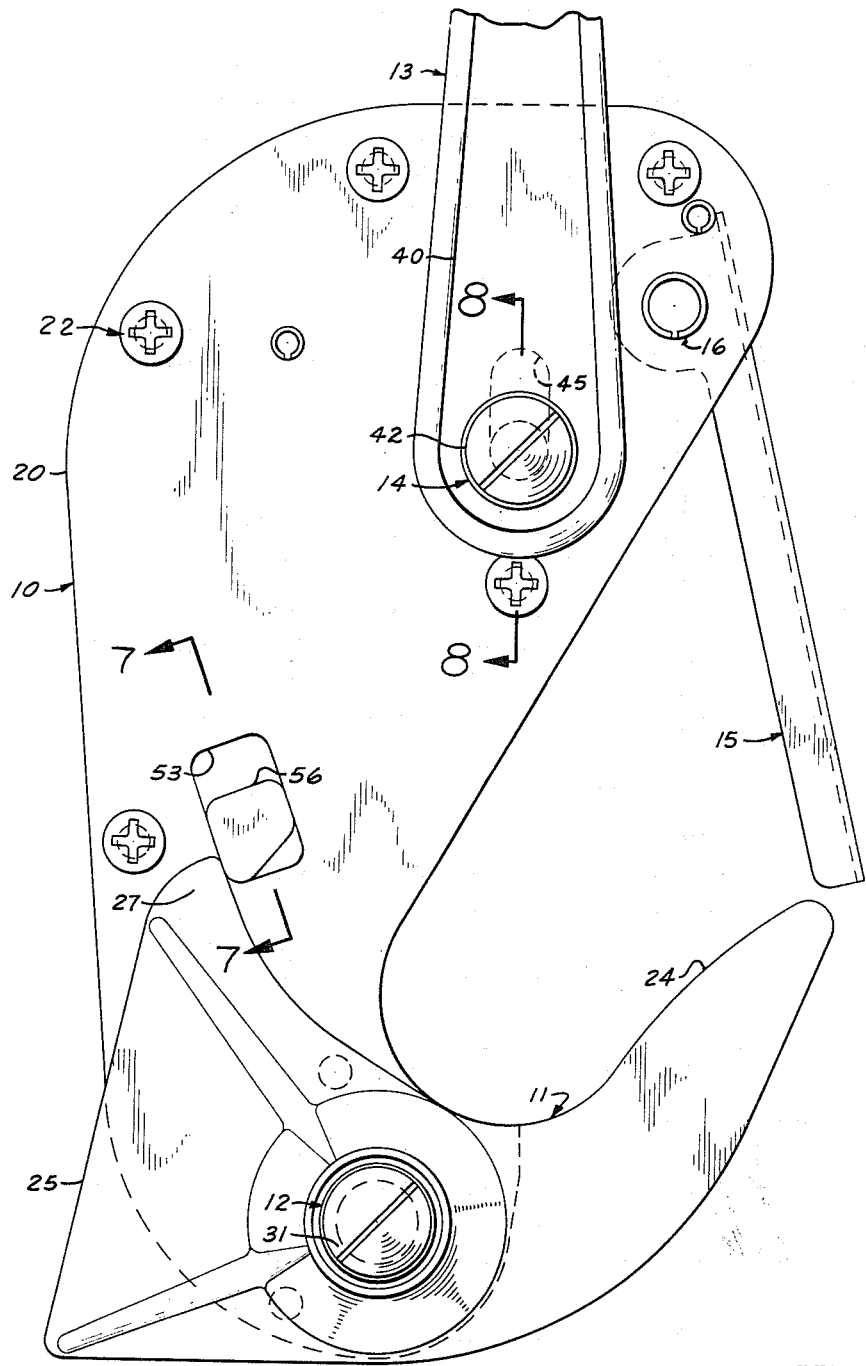
FIG. 1 is a side elevational view of a cargo hook assembly illustrative of the invention.

With continued reference to the drawings, the hook assembly comprises a frame, generally indicated at 10, a hook beam generally indicated at 11, connected to the lower end of the frame by a pivotal mounting, generally indicated at 12, a clevis or bail generally indicated at 13, extending above the hook frame and connected to the frame by a pivotal mounting, generally indicated at 14, and a keeper or guard 15 extending between the upper end portion of the frame 10 and the outer end of the beam 11 and secured to the frame by a pivotal mounting, generally indicated at 16.

The frame 10 comprises a pair of flat plates 20 and 21 secured together in parallel, superposed relationship by spaced apart fasteners, generally indicated at 22. Each fastener comprises a bolt or screw 23 extending through aligned apertures in the two frame plates and surrounded between the plates by a hollow, cylindrical spacer 28, all of the spacers 28 being of the same length to maintain the frame plates in the spaced apart, parallel relationship referred to above. The frame has an arcuately shaped lower end the curvature of which is centered on the axis of the pivotal mounting 12, upwardly diverging, substantially straight rear and front edges so that its upper end is materially wider than its lower end, and convexly curved corners at its upper end.

Figure 2:
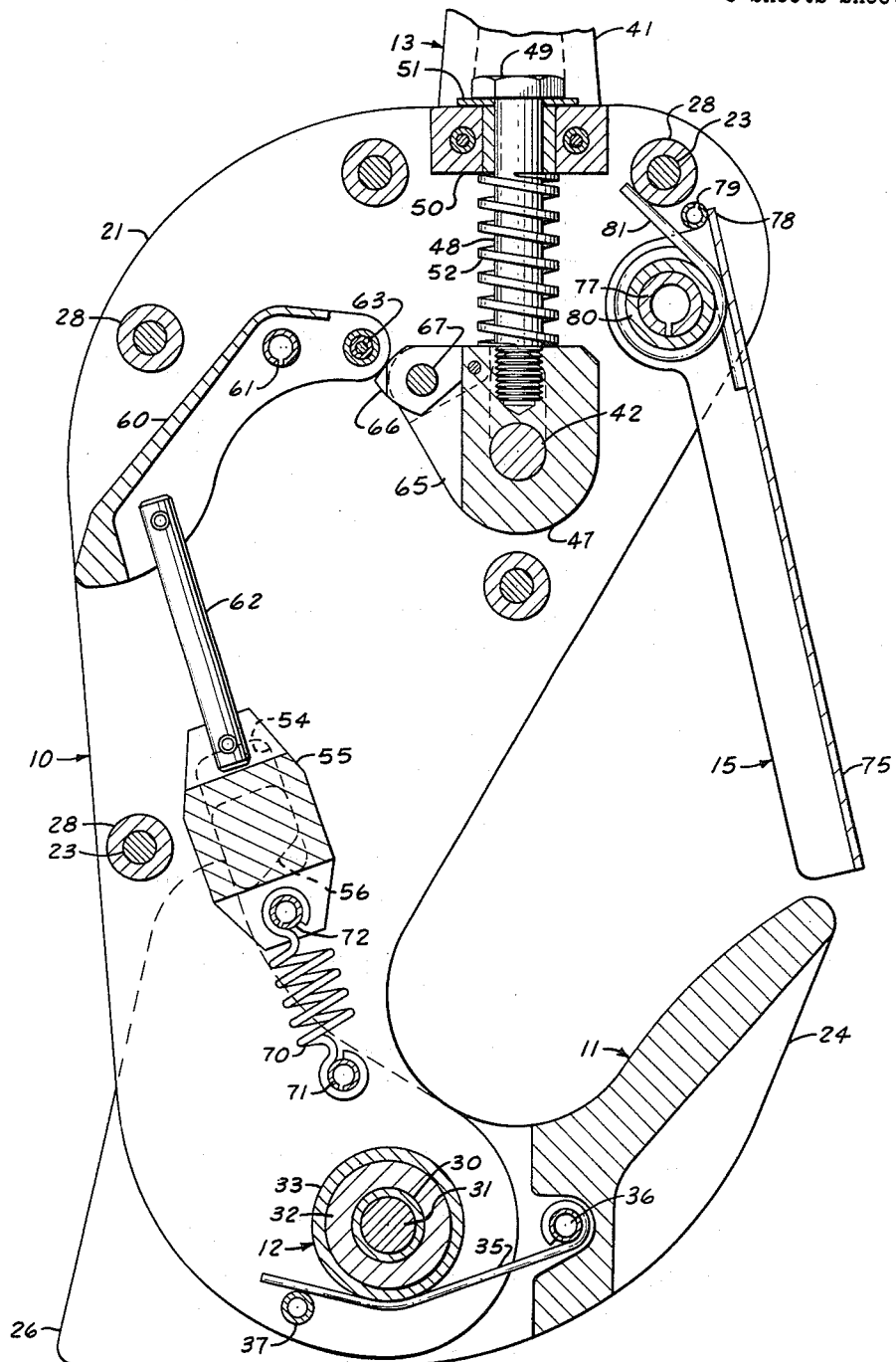
FIG. 2 is a cross-sectional view on a plane parallel to the plane of FIG. 1 but disposed inwardly thereof and showing the hook in closed or load supporting condition.

The hook beam 11 is preferably a forging of hard, wear resistant material, such as a hard steel alloy, and comprises a beak portion 24 which is upwardly and forwardly inclined when the hook is in its closed or load carrying condition, as shown in FIGS. 1 and 2, and a pair of side flanges or wings at 25 and 26 which extend rearwardly from the rearward end of the beak portion 24 and are spaced apart to receive the lower end of the frame between them, as is clearly shown in FIGS. 1 and 2. The wings 25 and 26 increase uniformly in width from the beak portion 24 rearwardly and each wing is provided at its rearward corner with a toe or sear formation, as indicated at 27 for the wing 25 in FIG. 1. The wings are provided with aligned apertures to receive the pivotal mounting assembly 12 which assembly comprises a hollow, cylindrical bearing 30 extending through both wings of the hook beam 11 and both plates of the frame 10, a bolt 31 extending entirely through the bearing 30 and provided with a head at one end and a nut at the other, an intermediate cylindrical bearing 32 which may be of resilient or shock absorbing material, and an outer cylindrical bearing 33 extending through the frame plates only and secured in these plates. A leaf spring 35 extends under the outer bearing 33 and is secured at one end, as indicated at 36, to the hook beam at the rear end of the beak portion 24 and rests at its opposite end on a pin 37 at the opposite side of the pivotal mounting 12 from the connection 36 so that the spring resiliently urges the hook beam 11 to the open or load releasing position shown in FIG. 4.

Figure 8:
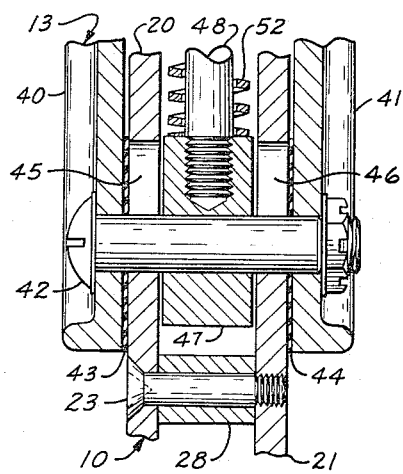
FIG. 8 is a fragmentary cross-sectional view substantially on a plane indicated by the line 8—8 on FIG. 1.

The two legs 40 and 41 of the bail 13, FIG. 8, straddle the upper end portion of the frame 10 and are apertured near their lower ends to receive the bolt 42. The upper or bight portion of the bail provides a loop for attaching the hook assembly to the cargo sling or harness depending from the frame of the aircraft. The frame plates 20 and 21 are apertured to receive the bolt 42 and these apertures are elongated longitudinally of the frame as shown in FIGS. 1 and 8. Flat bearing plates 43 and 44 are provided between the bail legs and the corresponding outer surfaces of the frame plates 20 and 21 surrounding the bolt 42 to facilitate sliding movements of the bail relative to the frame to the extent of the elongation of the bolt receiving apertures 45 and 46 in the frame plates. A block 47 is disposed between the frame plates at the location of the apertures 45 and 46 and this block has a bolt hole extending therethrough and closely receiving the bolt 42 so that the block also slides relative to the frame plates when the bail 13 slides. A stud 48 extends upwardly from the block 47 and is screw-threaded at its lower end into a tapped well in the upper portion of the block. At its upper end this stud is provided with a head 49 to facilitate threading the stud into and out of the block 47.

An abutment block 50 is secured in position between the frame plates at the upper end of the frame and is provided with an opening which receives a bearing bushing 51 through which the stud 48 extends, the stud being slidable in the bushing 51. A coiled compression spring 52 surrounds the stud 48 between the upper surface of the movable block 47 and the bottom surface of the abutment block 50, the purpose of this spring to be later described.

Figure 3:
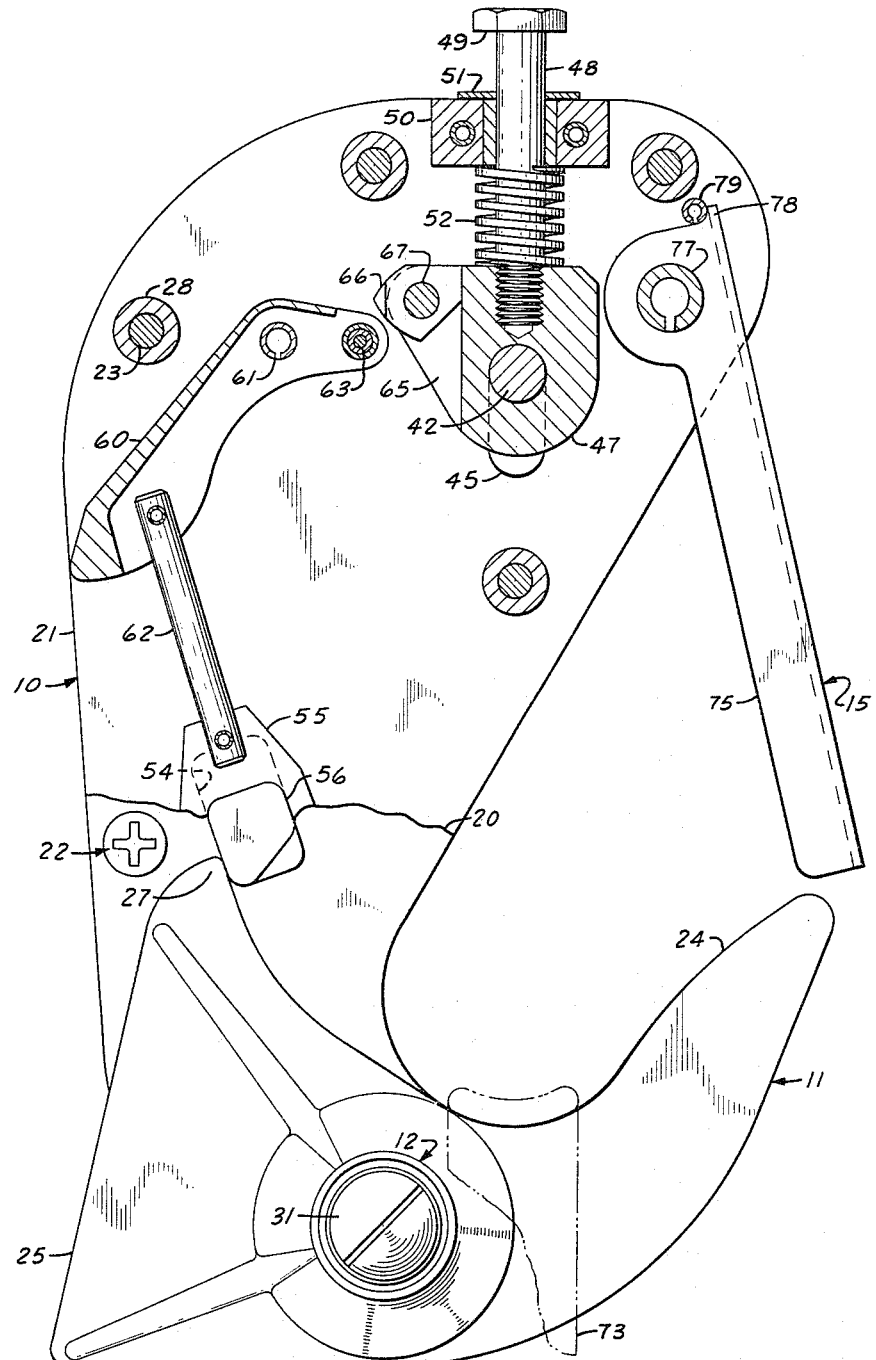
FIG. 3 is a view similar to FIG. 2 but with only the upper portion of the hook assembly broken away and shown in cross-section on substantially the same sectional plane as FIG. 2.
Figure 7:
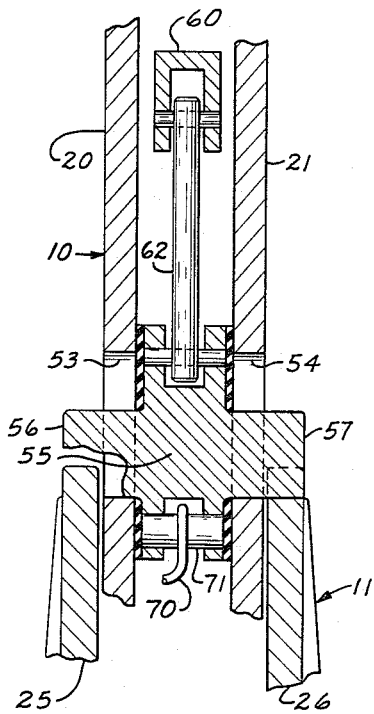
FIG. 7 is a fragmentary cross-sectional view substantially on a plane indicated by the line 7—7 on FIG. 1.

Intermediate their length the frame plates 20 and 21 are provided with mutually registering apertures 53 and 54 of elongated, rectangular shape and a latch block 55 is slidably disposed between the frame plates at the location of these apertures and has lateral extensions 56 and 57, which constitute latch dogs, extending through the apertures 53 and 54 and engaging the sear formations 27 of the hook beam wings 25 and 26, FIG. 7, when the hook is in its closed or load carrying condition, as shown in FIGS. 1 and 3. These dogs, engaging the rear upper corners of the wings 25 and 26, positively hold the hook beam in closed, load carrying condition until the block 55 is moved upwardly to disengage the dog formations 56 and 57 from the sear formation on the hook beam wings.

A lever 60 is disposed above the latch block 55 and pivotally mounted intermediate its length on a pivot pin 61 which extends through registering apertures in the lever and the two frame side plates 20 and 21. The end of the lever at the rearward side of the hook frame is connected by a pivoted link 62 to the block 55 and at its other end the lever carries an abutment pin 63. The lever 60 is of inverted channel shape in cross-section and has a bend or knee adjacent the pivot pin 61 which pivot pin is much nearer the end of the lever carrying the abutment pin 63 than the end of the lever to which the link 62 is pivotally connected. The upper end of the link 62 is pivotally connected to the lever by a pin extending through the link and through apertures in the flanges of the channel shaped lever 60 and the lower end of the link is connected to the block 55 by a pin which extends through the lower end of the lever and through lugs projecting upwardly from the block.

Figure 5:
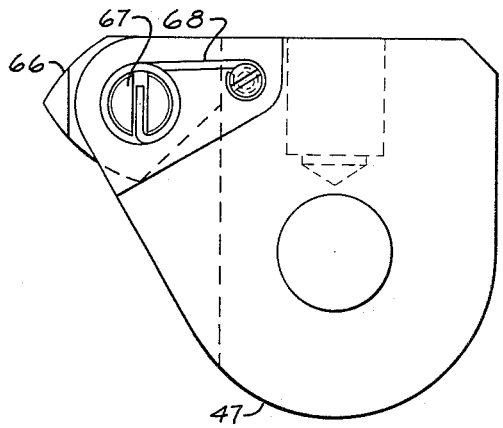
FIG. 5 is a detailed view on an enlarged scale of the latch operating mechanism shown in FIGS. 2, 3, and 4.
Figure 6:
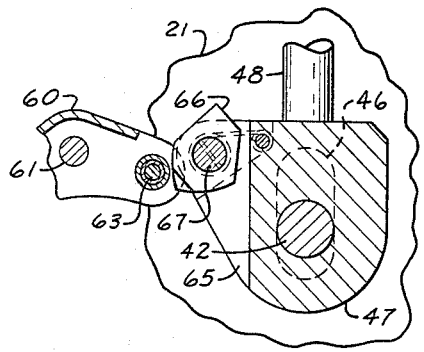
FIG. 6 is a view similar to FIG. 5 but on a reduced scale and with a portion of the mechanism shown in cross-section, the components being in a different operating position than the position shown in FIG. 2.

The block 47 is provided in the side thereof facing the lever 60 with a deep groove 65 and a detent 66 is positioned in the upper end of this groove and pivotally mounted on a pin 67 which extends through registering apertures in the detent and in the portions of the block 47 at opposite sides of the groove 65. This detent is resiliently urged to its upper limiting position by a torsion spring 68, FIG. 5, connected at one end to the detent supporting pin 67 and at its other end to the block 47, the pin 67 being secured to the detent against rotation relative thereto.

A tension spring 70 is connected between a spring pin 71 which extends through registering apertures in the frame plates 20 and 21 immediately above the pivotal mounting 12 and below the lower end of the latch block 55. At its upper end the spring is connected to the latch block by a pin 72 which extends through registering apertures provided in lugs disposed at respectively opposite sides of a groove in the lower end portion of the latch block, the spring tending to resiliently urge the latch block 55 downwardly so that the latch dogs 56 and 57 will engage the toe or sear formations on the upper rear corners of the wings of the hook beam 11.

Figure 4:
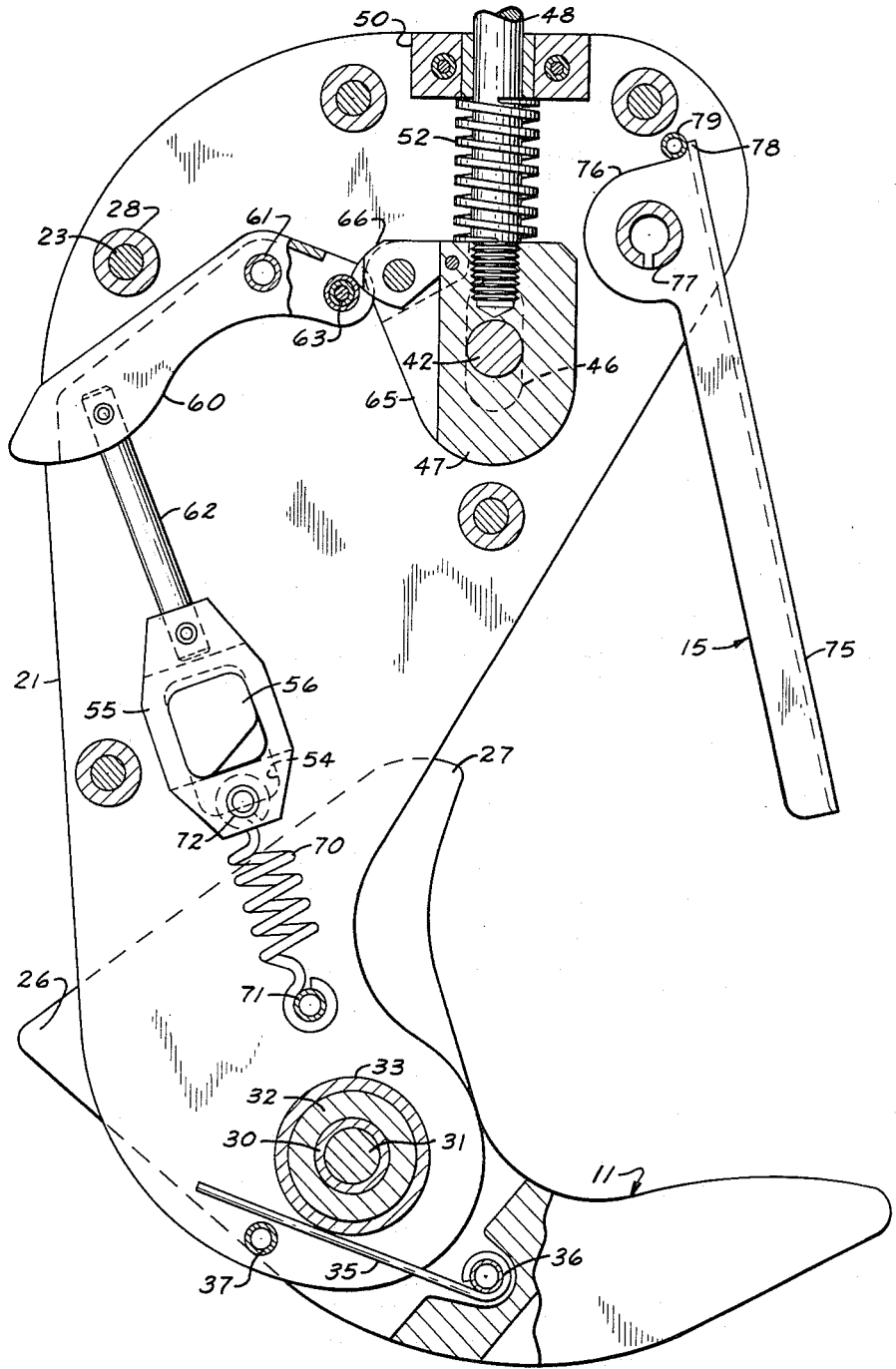
FIG. 4 is a cross-sectional view similar to FIG. 2 but showing the hook assembly in open or load releasing condition.

With this construction, when the hook is unloaded but in condition to engage a load harness, such as the harness of an air transportable cargo package, the parts are all in the relative positions illustrated in FIG. 2. When the hook assembly is loaded, as by engaging it with the harness target ring 73 and raising the associated aircraft to lift the load, the parts retain the same position except that the bail 13 is moved upwardly relative to the frame 10 to the upper ends of the slots 45 and 46 in the frame plates carrying with it the block 47 and stud 48 and compressing the spring 52. During this upward movement of the block 47 the detent 66 rocks past the detent of abutment pin 63 so that the detent is now positioned above the pin 63 and will engage the pin 63 and rock the lever 60 when the block 47 moves downwardly, the detent being held against rocking movement during this operation by engagement of its upper forward corner with the bottom of the groove 65 in the block 47. If now the pilot of the aircraft touches the suspended load down on the ground thereby relieving the hook of its load, the parts move to the position illustrated in FIG. 4. As soon as the hook is relieved of the weight of the suspended load the compression spring 52 expands moving the block 47 downwardly and engaging the detent 66 with the abutment pin 63 carried by the lever 60. Downward movement of the detent 66 with the block 47 rocks the lever 60 in the clockwise direction, as illustrated in FIG. 4, pulling up on the link 62 and raising the latch block 55 to move the latch dogs 56 and 57 upwardly and out of engagement with the sear formations 27 on the wings of the hook beam 11. The spring 70 has much less strength than the spring 52 so that the spring 70 is expanded when the latch block is moved upwardly by expansion of the spring 52. When the sear formations 27 are release by the latch dogs 56 and 57 the hook beam drops to the position shown in FIG. 4 and the harness loop or target ring slides off of the beak portion of the hook beam thereby freeing the hook from the load. After the hook has been freed of the load and left in the load releasing position it must be manually reset to load supporting position against the force of spring 35. It is contemplated that a cable may be run from the hook beam to the pilot's compartment of the associated aircraft for this purpose. It will be noted that the latch dogs 56 and 57 are beveled forwardly and upwardly on their upper surfaces and that the rearward edges of the sear formations 27 are curved so that when the hook is manually returned these sear formations will easily pass the latch dogs which thereafter drop into position against the forward edges of the sear formations to hold the hook in closed condition. Upon expansion of the spring 52 when the load is released the block 47 and detent 66 are moved downwardly until the detent passes the abutment pin 63 thereby freeing the lever 60 to rock in the counter-clockwise direction, as illustrated in FIG. 4, under the urgency of the spring 70 which spring thus acts to pull the latch block 55 and dogs 56 and 57 downwardly to engage the latch dogs with the sear formations on the wings of the hook beam.

The guard 15 comprises a straight tongue 75 of channel shaped cross-section having at its upper end an arcuate enlargement 76 provided with mutually registering apertures which register with apertures in the frame plates 20 and 21 and receive a cylindrical pivot pin or sleeve 77 at its upper end. The tongue is provided with a stop formation 78 which engages a stop pin 79 extending through registering apertures in the frame plates to limit outward movement of the guard to the position shown in FIG. 4. A sleeve 80 is secured between the flanges of the channel shaped guard tongue and surrounds the pivot sleeve 77 to support the guard for rocking movement in the clockwise direction from the position illustrated in FIGS. 2 and 4 when a cargo harness loop or ring is engaged with the hook. The guard 15 is resiliently urged to its outer limiting position by a torsion spring 81 which surrounds the sleeve 80 and has one end bearing against the web portion of the channel shaped tongue 75 and its other end bearing against an adjacent spacer 28 surrounding a corresponding screw 23. The spring permits the guard to be swung inwardly so that a cargo harness loop or ring can be placed on the hook beam 11 and then returns the guard to its outer position, as shown in FIGS. 2 and 4, wherein it prevents accidental movement of the harness loop or ring off of the beak portion of the hook beam.

While an operative embodiment of the cargo hook assembly has been hereinabove described and illustrated in the accompanying drawing for the purpose of fully disclosing the invention, it is to be understood that the invention is not limited to the embodiment so illustrated and described but that various changes and modifications within the scope of the appended claims may be made without in any way exceeding the scope of the invention.

I claim:

1. A hook assembly for suspending an air transportable cargo package from an aircraft comprising an elongated frame including a pair of flat plates and fasteners securing said plates together in spaced apart, substantially parallel and superposed relationship, a first pivotal mounting inserted in said frame near one end thereof, a second pivotal mounting inserted in said frame near the other end thereof and movable longitudinally of said frame, a spring urging said second pivotal mounting to its inner limiting position relative to said frame, a hook beam secured to said frame by said first pivotal connection and swingable between a hook closing and a hook opening position, said beam having its rearward portion divided to provide wings disposed at respectively opposite sides of said frame and each of said wings having a sear formation thereon, a latch block disposed within said frame and slidable longitudinally thereof, dog formations projecting from said latch block through said frame and engageable with said sear formations to releasably hold said hook beam in hook closing position, a bail connected to said frame by said second pivotal mounting for connecting said hook assembly to an aircraft cargo sling, a lever pivotally connected on said frame above said latch block and connected at one end to said latch block, a block connected to said bail and movable with said bail up and down relative to said frame, a detent carried by said bail connected block and engageable with the other end of said lever to rock said lever in a direction to move said latch dogs out of engagement with said sear formations to release said hook beam upon expansion of said spring when said hook assembly is relieved of a suspended load.

2. A hook assembly for suspending an air transportable cargo package from an aircraft comprising an elongated frame including a pair of flat plates and fasteners securing said plates together in spaced apart, substantially parallel and superposed relationship, a first pivotal mounting inserted in said frame near one end thereof, a second pivotal mounting inserted in said frame near the other end thereof and movable longitudinally of said frame, a spring urging said second pivotal mounting to its inner limiting position relative to said frame, a hook beam secured to said frame by said first pivotal connection and swingable between a hook closing and a hook opening position, said beam having its rearward portion divided to provide wings disposed at respectively opposite sides of said frame and each of said wings having a sear formation thereon, a latch block disposed within said frame and slidable longitudinally thereof, dog formations projecting from said latch block through said frame and engageable with said sear formations to releasably hold said hook beam in hook closing position, a bail connected to said frame by said second pivotal mounting for connecting said hook assembly to an aircraft cargo sling, a lever pivotally connected to said frame above said latch block and connected at one end to said latch block, a block connected to said bail and movable with said bail up and down relative to said frame, a detent carried by said bail connected block and engageable with the other end of said lever to rock said lever in a direction to move said latch dogs out of engagement with said sear formations to release said hook beam upon expansion of said spring when said hook assembly is relieved of a suspended load, and a spring connected to said latch block and said frame and effective to return said latch dogs to position to re-engage said sear formations when said detent passes by the adjacent end of said lever.

3. A hook assembly for suspending an air transportable cargo package from an aircraft comprising an elongated frame including a pair of flat plates and fasteners securing said plates together in spaced apart, substantially parallel and superposed relationship, a first pivotal mounting inserted in said frame near one end thereof, a second pivotal mounting inserted in said frame near the other end thereof and movable longitudinally of said frame, a spring urging said second pivotal mounting to its inner limiting position relative to said frame, a hook beam secured to said frame by said first pivotal connection and swingable between a hook closing and a hook opening position, said beam having its rearward portion divided to provide wings disposed at respectively opposite sides of said frame and each of said wings having a sear formation thereon; a latch block disposed within said frame and slidable longitudinally thereof, dog formations projecting from said latch block through said frame and engageable with said sear formations to releasably hold said hook beam in hook closing position, a bail connected to said frame by said second pivotal mounting for connecting said hook assembly to an aircraft cargo sling, a lever pivotally connected to said frame above said latch block and connected at one end to said latch block, a block connected to said bail and movable with said bail up and down relative to said frame, a detent carried by said bail connected block and engageable with the other end of said lever to rock said lever in a direction to move said latch dogs out of engagement with said sear formations to release said hook beam upon expansion of said spring when said hook assembly is relieved of a suspended load, a spring connected to said latch block and said frame and effective to return said latch dogs to position to re-engage said sear formations when said detent passes by the adjacent end of said lever, and a spring acting between said frame and said hook beam resiliently urging said hook beam to hook opening position.

References Cited by the Examiner
UNITED STATES PATENTS

| | | | |
|---|---|---|---|
| 2,057,507 | 10/1936 | Weidenbacker | 308—26 |
| 2,858,161 | 10/1958 | Smith | 294—83 |

GERALD M. FORLENZA, *Primary Examiner.*

HUGO O. SCHULZ, *Examiner.*